US010097427B2

(12) United States Patent
Qian et al.

(10) Patent No.: US 10,097,427 B2
(45) Date of Patent: *Oct. 9, 2018

(54) SERVICE ASSURANCE PLATFORM AS A USER-DEFINED SERVICE

(71) Applicant: AT&T Intellectual Property I, L.P., Atlanta, GA (US)

(72) Inventors: Zhiqiang Qian, Holmdel, NJ (US); Robert Best, Dallas, TX (US); David H. Lu, Irving, TX (US); Michael John Zinnikas, N. Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,060

(22) Filed: Jan. 29, 2018

(65) Prior Publication Data
US 2018/0152359 A1 May 31, 2018

Related U.S. Application Data

(63) Continuation of application No. 14/527,264, filed on Oct. 29, 2014, now Pat. No. 9,882,789.

(51) Int. Cl.
*H04L 12/24* (2006.01)
(52) U.S. Cl.
CPC ...... *H04L 41/5054* (2013.01); *H04L 41/5006* (2013.01); *H04L 41/5051* (2013.01); *H04L 41/5025* (2013.01)

(58) Field of Classification Search
CPC ............. H04L 41/5006; H04L 41/5025; H04L 41/5051; H04L 41/5054
See application file for complete search history.

(56) References Cited

U.S. PATENT DOCUMENTS

| 6,571,285 | B1 | 5/2003 | Groath et al. |
| 6,735,293 | B2 | 5/2004 | Doherty et al. |
| 8,028,088 | B2 | 9/2011 | Visser |
| 8,370,462 | B2 | 2/2013 | Pelletier et al. |
| 8,504,319 | B2 | 8/2013 | Qian et al. |
| 8,793,363 | B2 | 7/2014 | Sater et al. |
| 2005/0027851 | A1* | 2/2005 | McKeown .......... H04L 12/2874 709/224 |

(Continued)

OTHER PUBLICATIONS

U.S. Office Action dated Jun. 13, 2016 in U.S. Appl. No. 14/527,264.

(Continued)

*Primary Examiner* — Arvin Eskandarnia
*Assistant Examiner* — Gil H. Lee
(74) *Attorney, Agent, or Firm* — Hartman & Citrin LLC

(57) ABSTRACT

Concepts and technologies are disclosed herein for a service assurance platform. A service assurance platform can be provided by a computing device comprising a processor. The computing device can obtain a service order comprising a request for functionality. The computing device can initiate determination of service offerings available to provide the functionality and initiate presentation of the service offerings determined to be available. The computing device can obtain a selection of a service offering of the service offerings and initiate orchestration of the service offering to instantiate a service that provides the functionality.

20 Claims, 6 Drawing Sheets

(56) References Cited

U.S. PATENT DOCUMENTS

| | | | |
|---|---|---|---|
| 2006/0015589 A1* | 1/2006 | Ang | H04L 67/34 709/220 |
| 2008/0046266 A1 | 2/2008 | Gudipalley et al. | |
| 2010/0076798 A1 | 3/2010 | French | |
| 2010/0125666 A1* | 5/2010 | Yang | G06Q 10/06 709/225 |
| 2010/0306353 A1 | 12/2010 | Briscoe et al. | |
| 2011/0219111 A1 | 9/2011 | Shevenell | |
| 2012/0005338 A1 | 1/2012 | Visser | |
| 2012/0137003 A1* | 5/2012 | Ferris | H04W 4/003 709/226 |
| 2013/0074181 A1* | 3/2013 | Singh | H04L 41/0668 726/22 |
| 2013/0227103 A1 | 8/2013 | Garimella et al. | |
| 2013/0283274 A1* | 10/2013 | Mimran | G06F 9/46 718/100 |
| 2014/0068035 A1 | 3/2014 | Croy et al. | |
| 2014/0068348 A1* | 3/2014 | Mondal | H04L 41/16 714/45 |
| 2014/0229614 A1* | 8/2014 | Aggarwal | H04M 3/2227 709/224 |
| 2014/0334495 A1* | 11/2014 | Stubberfield | H04L 49/354 370/401 |
| 2015/0006733 A1* | 1/2015 | Khan | H04L 47/70 709/226 |

OTHER PUBLICATIONS

U.S. Office Action dated Oct. 7, 2016 in U.S. Appl. No. 14/527,264.
U.S. Office Action dated Mar. 9, 2017 in U.S. Appl. No. 14/527,264.
U.S. Notice of Allowance dated Sep. 11, 2017 in U.S. Appl. No. 14/527,264.

\* cited by examiner

SERVICE ASSURANCE PLATFORM AS A USER-DEFINED SERVICE

CROSS-REFERENCE TO RELATED APPLICATIONS

This application is a continuation of and claims priority to U.S. patent application Ser. No. 14/527,264, entitled "Service Assurance Platform as a User-Defined Service," filed Oct. 29, 2014, now U.S. Pat. No. 9,882,789, which is incorporated herein by reference in its entirety.

BACKGROUND

Virtualization and other technologies for networking can provide users and/or other entities with the ability to create or order services to define network services without engaging vendors, engineers, or the like to provide new hardware and/or tightly coupled applications. Thus, applications and/or services may be provided by receiving and/or acting on requests for functionality. Service assurance in the networking arts generally has previously been defined as a fixed set of services defined by the vendor for all users of the service. These fixed services have been initiated through service trouble tickets and the vendor's personnel engaging additional hardware and/or software vendors to locate root causes of failures, which may be a lengthy process.

SUMMARY

The present disclosure is directed to a service assurance platform as a user-defined service. Network function virtualization can enable a software defined network. With a software defined network, problems can be remediated much faster than with other traditional network technologies. As such, a software defined network can enable the implementation of a service assurance platform to enable user-defined service assurance features that can better match needs of the user compared to the paradigm of a fixed set of service assurance capabilities defined by a vendor. According to various embodiments, a service assurance platform can be provided by a computing device, which can execute one or more modules, applications, services, or the like, to provide a set of service assurance features defined by the user. The service assurance platform can obtain a service order initiated by the user or elsewhere. The service order can be obtained from one of various entities via one of various application programming interfaces ("APIs") that can be exposed by the computing system and/or the modules executed by the computing system. Regardless of the source of the service order and/or the API via which the service order is received at the service assurance platform (and/or the computing device that executes the service assurance platform), the service assurance platform can initiate determination of one or more service offerings that satisfy the service order.

A service assurance orchestrator can be configured, in some embodiments, to determine the available service offerings. The service assurance orchestrator also can interact with a service assurance application API store, in some embodiments, as part of compiling one or more lists of service offerings. The service assurance platform can present the service offerings to a user or other entity. In some embodiments, the service assurance platform can interact with and/or execute a service assurance visualizer to present the service offerings and/or to obtain selections of service offerings. In some embodiments, for example, the service assurance platform can execute the service assurance visualizer to interface with a display of the computing device and/or another device such as a user device, which can display the service offerings. A user or other entity associated with the computing device and/or the user device can make a selection of a desired service offering and/or various features or functionality associated with the selected service offering.

The service assurance platform can initiate orchestration of the selected service offering(s). In some embodiments, the service assurance platform can engage the service assurance orchestrator to orchestrate the various physical network resources and/or virtual network resources for a service requested by way of the service order. Thus, the service assurance orchestrator can instantiate the hardware and/or software used to provide the service. The service assurance platform also can monitor the service to provide service assurance.

In various embodiments, the service assurance platform also can monitor the service instantiated. The service assurance platform therefore can be configured to provide alert detection and/or resolution for the service. According to various embodiments, the service assurance platform can detect or receive an alert or other indicator of a failure or malfunction associated with the service and/or resources that provide the service. In response to the alert, the service assurance platform can determine a root cause associated with the alert. According to various embodiments, the network manager can be executed by the service assurance platform and/or the computing device to perform the root cause analysis associated with the alert. The service assurance platform also can engage or allow analysis of the alert and/or network conditions or other information by a data analysis element to perform the root cause analysis.

The service assurance platform can identify a solution (or be provided with information indicating the solution), and can resolve the issue in accordance with the identified or provided solution. After resolving the malfunction, error, failure, or the like, the service assurance platform can verify connections associated with the service, close the alert or indicate that the alert has been resolved, and store data relating to the alert and/or the solution to the issue indicated by the alert. In some embodiments, the service assurance platform can expose the data to a data analysis system via the big data API, though this is not necessarily the case. It should be understood that this example is illustrative and therefore should not be construed as being limiting in any way.

As such, it can be appreciated that embodiments of the concepts and technologies described herein can help realize a reduction in information technology costs, reduction of service development lifecycles, maintenance of services in real-time or near real-time, adaptive and corrective maintenance without human intervention, elimination of work center technicians to manually isolate network or other issues associated with the service, and/or improvement to quality of services and client satisfaction. It should be understood that these benefits are illustrative and/or are optional, and therefore should not be construed as being limiting in any way.

According to one aspect of the concepts and technologies disclosed herein, a method is disclosed. The method can include obtaining, by a computing device including a processor, a service order. The service order can include a request for functionality. The method also can include initiating, by the computing device, determination of service offerings available to provide the functionality. The computing device can initiate presentation of the service offerings determined to be available and obtain a selection of a service offering of the service offerings. The method also can include initiating, by the computing device, orchestration of the service offering to instantiate a service that provides the functionality.

In some embodiments, initiating the determination of the service offerings can include executing a service assurance orchestrator to determine the available service offerings. In some embodiments, the service can include multiple functions. In some embodiments, initiating the presentation of the service offerings can include executing a service assurance visualizer to present the service offerings. In some embodiments, the method can further include monitoring the service to provide service assurance.

In some embodiments, the method can also include detecting an alert relating to the service, determining a root cause associated with the alert, identifying a solution for the root cause determined, and resolving an issue associated with the alert. In some embodiments, determining the root cause can include outputting data to a data analysis system via a big data application programming interface.

According to another aspect of the concepts and technologies disclosed herein, a system is disclosed. The system can include a processor and a memory. The memory can store computer-executable instructions that, when executed by the processor, cause the processor to perform operations. The operations can include obtaining a service order including a request for functionality, initiating determination of service offerings available to provide the functionality, initiating presentation of the service offerings determined to be available, obtaining a selection of a service offering of the service offerings, and initiating orchestration of the service offering to instantiate a service that provides the functionality.

In some embodiments, the instructions, when executed by the processor, cause the processor to perform operations further including monitoring the service to provide service assurance. In some embodiments, the instructions, when executed by the processor, cause the processor to perform operations that further can include detecting an alert relating to the service, determining a root cause associated with the alert, identifying a solution for the root cause determined, resolving an issue associated with the alert, and monitoring the service to provide service assurance.

In some embodiments, the system also can include a big data application programming interface. Determining the root cause can include outputting data to a data analysis system via the big data application programming interface. In some embodiments, the system also can include a service assurance visualizer. Initiating the presentation of the service offerings can include executing the service assurance visualizer to present the service offerings. In some embodiments, the system also can include a service assurance orchestrator. Initiating the determination of the service offerings can include executing the service assurance orchestrator to determine the available service offerings.

According to yet another aspect, a computer storage medium is disclosed. The computer storage medium can have computer-executable instructions stored thereon. When the computer-executable instructions are executed by a processor, the instructions can cause the processor to perform operations. The operations can include obtaining a service order including a request for functionality, initiating determination of service offerings available to provide the functionality, initiating presentation of the service offerings determined to be available, obtaining a selection of a service offering of the service offerings, and initiating orchestration of the service offering to instantiate a service that provides the functionality.

In some embodiments, the instructions, when executed by the processor, cause the processor to perform operations further including monitoring the service to provide service assurance. In some embodiments, the instructions, when executed by the processor, cause the processor to perform operations further including detecting an alert relating to the service, determining a root cause associated with the alert, identifying a solution for the root cause determined, resolving an issue associated with the alert, and monitoring the service to provide service assurance.

In some embodiments, determining the root cause can include outputting data to a data analysis computer storage medium via a big data application programming interface. In some embodiments, initiating the presentation of the service offerings can include executing a service assurance visualizer to present the service offerings. In some embodiments, initiating the determination of the service offerings can include executing a service assurance orchestrator to determine the available service offerings. In some embodiments, the service can be instantiated on a network including a software defined networking network, a legacy network, and a virtual private networking network that host hardware devices and virtual devices that host the service.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
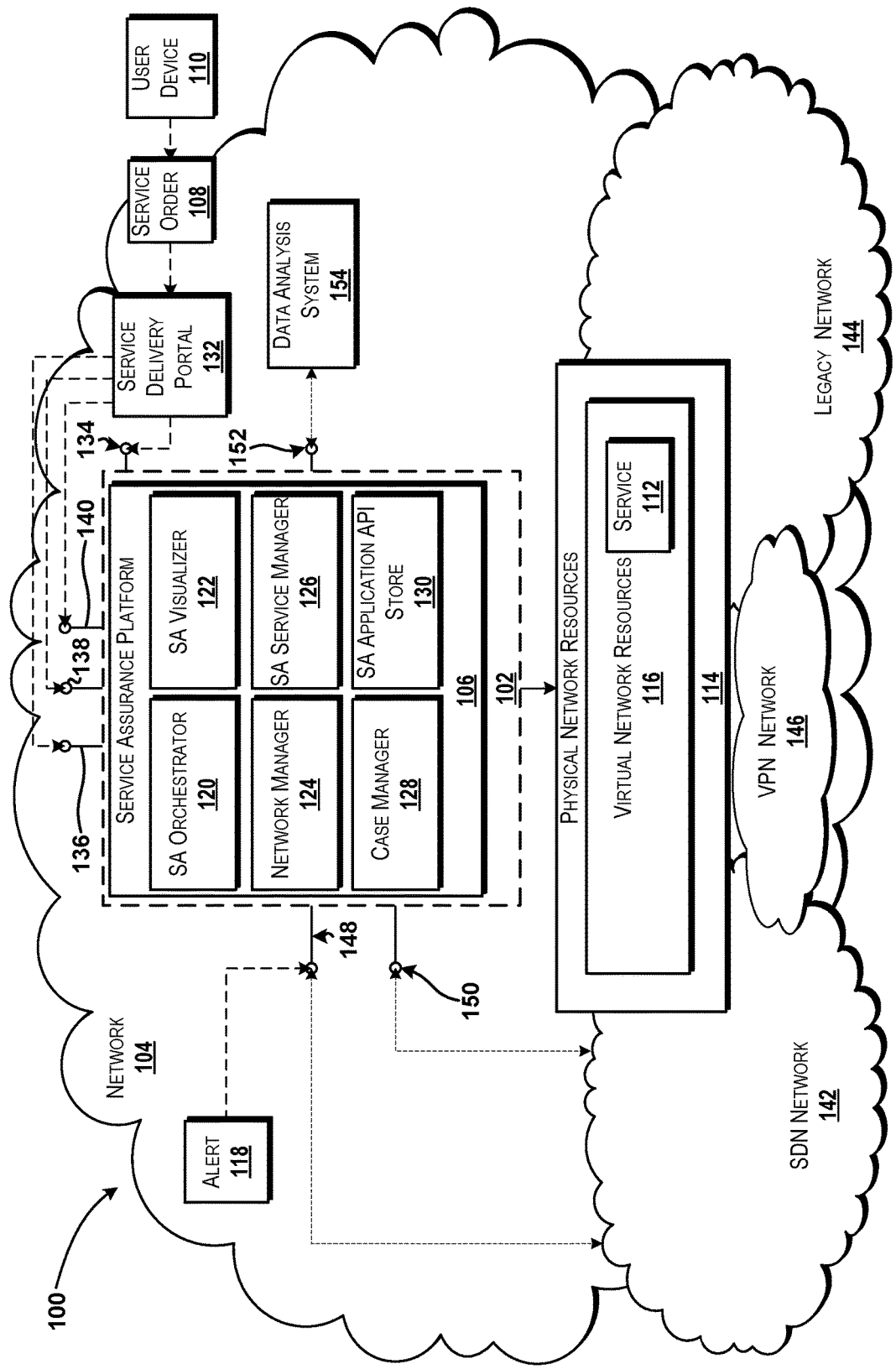
FIG. 1 is a system diagram illustrating an illustrative operating environment for various embodiments of the concepts and technologies described herein.

The following detailed description is directed to a service assurance platform. According to various embodiments, a service assurance platform can be provided by a computing device, which can execute one or more modules, applications, services, or the like. The service assurance platform can obtain a service order. The service order can be obtained from one of various entities via one of various application programming interfaces ("APIs") that can be exposed by the computing system and/or the modules executed by the computing system. Regardless of the source of the service order and/or the API via which the service order is received at the service assurance platform (and/or the computing device that executes the service assurance platform), the service assurance platform can initiate determination of one or more service offerings that satisfy the service order.

A service assurance orchestrator can be configured, in some embodiments, to determine the available service offerings. The service assurance orchestrator also can interact with a service assurance application API store, in some embodiments, as part of compiling one or more lists of service offerings. The service assurance platform can present the service offerings to a user or other entity. In some embodiments, the service assurance platform can interact with and/or execute a service assurance visualizer to present the service offerings and/or to obtain selections of service offerings. In some embodiments, for example, the service assurance platform can execute the service assurance visualizer to interface with a display of the computing device and/or another device such as a user device, which can display the service offerings. A user or other entity associated with the computing device and/or the user device can make a selection of a desired service offering and/or various features or functionality associated with the selected service offering.

The service assurance platform can initiate orchestration of the selected service offering(s). In some embodiments, the service assurance platform can engage the service assurance orchestrator to orchestrate the various physical network resources and/or virtual network resources for a service requested by way of the service order. Thus, the service assurance orchestrator can instantiate the hardware and/or software used to provide the service. The service assurance platform also can monitor the service to provide service assurance.

In various embodiments, the service assurance platform also can monitor the service instantiated. The service assurance platform therefore can be configured to provide alert detection and/or resolution for the service. According to various embodiments, the service assurance platform can detect or receive an alert or other indicator of a failure or malfunction associated with the service and/or resources that provide the service. In response to the alert, the service assurance platform can determine a root cause associated with the alert. According to various embodiments, the network manager can be executed by the service assurance platform and/or the computing device to perform the root cause analysis associated with the alert. The service assurance platform also can engage or allow analysis of the alert and/or network conditions or other information by a data analysis element to perform the root cause analysis.

The service assurance platform can identify a solution (or be provided with information indicating the solution), and can resolve the issue in accordance with the identified or provided solution. After resolving the malfunction, error, failure, or the like, the service assurance platform can verify connections associated with the service, close the alert or indicate that the alert has been resolved, and store data relating to the alert and/or the solution to the issue indicated by the alert. In some embodiments, the service assurance platform can expose the data to a data analysis system via the big data API, though this is not necessarily the case. It should be understood that this example is illustrative and therefore should not be construed as being limiting in any way.

As such, it can be appreciated that embodiments of the concepts and technologies described herein can help realize a reduction in information technology costs, reduction of service development lifecycles, maintenance of services in real-time or near real-time, adaptive and corrective maintenance without human intervention, elimination of work center technicians to manually isolate network or other issues associated with the service, and/or improvement to quality of services and client satisfaction. It should be understood that these benefits are illustrative and/or are optional, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing a service assurance platform will be described, according to an illustrative embodiment of the concepts and technologies described herein. The operating environment 100 shown in FIG. 1 includes a computing device 102. The computing device 102 can operate in communication with and/or as part of a communications network ("network") 104.

According to various embodiments of the concepts and technologies described herein, the functionality of the computing device 102 may be provided by one or more server computers, desktop computers, mobile telephones or smartphones, laptop computers, tablet computers, other computing systems, and the like. It should be understood that the functionality of the computing device 102 can be provided by a single device, by two similar devices, and/or by two or more dissimilar devices. Thus, the functionality of the computing device 102 may be provided by a distributed or virtual computing system, as generally is understood. For purposes of describing the concepts and technologies disclosed herein, the computing device 102 is described herein as a personal computer. It should be understood that this embodiment is illustrative, and should not be construed as being limiting in any way.

The computing device 102 can execute an operating system (not shown in FIG. 1) and one or more application programs such as, for example, an ordering application, a network monitoring application, a web browser, other applications, combinations thereof, or the like (not shown in FIG. 1). The operating system can include a computer program for controlling the operation of the computing device 102. The application programs can include executable programs configured to execute on top of the operating system to provide various functions to the computing device 102.

According to various embodiments of the concepts and technologies described herein, the computing device 102 can be used by a network operator, network engineer, other network personnel, and/or other entities to interact with and/or control a service assurance platform 106. The computing device 102 also can host and/or execute the service assurance platform 106 as will be explained in more detail hereinbelow. The service assurance platform 106 can execute various modules to analyze service orders (e.g., the service order 108 shown in FIG. 1), obtain service offerings based upon the service orders 108, communicate with users and/or user devices (e.g., the user device 110), deploy services 112 responsive to service orders 108, request and/or orchestrate allocation of physical network resources 114 and/or virtual network resources 116 to host the services 112, detect failure conditions on the network 104 (e.g., by receiving one or more alerts 118), resolve the failure conditions and/or suspend the alerts 118, monitor the services 112, combinations thereof, or the like. These and other functions associated with the service assurance platform 106 will be illustrated and described in more detail below.

The computing device 102 can host and/or execute the service assurance platform 106, which can include one or more services, engines, applications, modules, or other computer-executable instructions or code. The computer-executable instructions can be stored in a memory or other computer storage medium as defined herein (referred to as a "memory" for purposes of simplifying the description). When executed by a processor of the service assurance platform 106 and/or the computing device 102 (the processor is not shown in FIG. 1), the computer-executable instructions can cause the computing device to perform various operations to provide the various functions of the service assurance platform 106 illustrated and described herein. Thus, while the specific modules, applications, or services illustrated and described herein are not necessarily mentioned with regard to each function provided by those modules, applications, or services, the service assurance platform 106 can execute these modules, applications, or services to provide the functionality described herein.

In the embodiment illustrated in FIG. 1, the service assurance platform 106 can include a service assurance orchestrator (labeled "SA orchestrator" in FIG. 1) 120, a service assurance visualizer (labeled "SA visualizer" in FIG. 1) 122, a network manager 124, a service assurance service manager (labeled "SA service manager" in FIG. 1) 126, a case manager 128, and a service assurance application API store (labeled "SA application API store" in FIG. 1) 130. Functionality associated with each of these components will be described in additional detail below after defining the various components of the operating environment 100 illustrated and described in FIG. 1.

In FIG. 1, the service assurance orchestrator 120, the service assurance visualizer 122, the network manager 124, the service assurance service manager 126, the case manager 128, and the service assurance application API store 130 are illustrated as components of the service assurance platform 106. It should be understood that each of these components, or combinations thereof, may be embodied as or in stand-alone devices or components thereof operating as part of or in communication with the computing device 102, the network 104, and/or the service assurance platform 106. As such, the illustrated embodiment should be understood as being illustrative of only some contemplated embodiments and should not be construed as being limiting in any way.

The service assurance platform 106 can be configured to detect submission of a service order such as the service order 108 shown in FIG. 1. According to various embodiments of the concepts and technologies described herein, the service order 108 can be submitted to the service assurance platform 106 via a service delivery portal 132. In some embodiments, the service delivery portal 132 can communicate with the service assurance platform 106 via an application programming interface ("API") 134, though this is not necessarily the case. The service order 108 can be received via other portals and/or associated APIs. The other portals (not shown in FIG. 1) can include, for example, a work center portal, which can communicate with the service assurance platform 106 via a work center API 136; a legacy service portal, which can communicate with the service assurance platform 106 via a legacy service API 138; an event manager portal, which can communicate with the service assurance platform 106 via an event manager API 140; combinations thereof; or the like. The APIs 134, 136, 138, 140 can include various types of APIs that can support various technologies.

The service order 108 can correspond to a request or order for a service 112. The service order 108 also can define particular functions or functionality that is desired in the service 112 requested by way of the service order 108. Thus, the service assurance platform 106 can, by analyzing the service order 108, perform operations to determine what service 112 or type of service 112 will satisfy the service order 108 and/or perform operations to fulfill the service order 108. Various aspects of the concepts and technologies described herein for providing the service 112 will be illustrated and described in more detail below, as will other aspects of the concepts and technologies described herein for monitoring the service 112 and/or providing service assurance for the service 112.

The physical network resources 114 can include various resources located at or in communication with a data center, a server farm, or other computing site. For example, the physical network resources 114 can include one or more server computers, one or more data storage devices, one or more processor resources, one or more memory devices, combinations thereof, or the like. In some embodiments, the physical network resources 114 can include one or more physical network resources associated with one or more of the network 104, a software defined networking ("SDN") network 142, a legacy network 144, combinations thereof, or the like. As shown in FIG. 1, the network 104 can support or provide a virtual private networking ("VPN") network 146, which can be used to establish or enable connectivity among and/or between the SDN network 142, the legacy network 144, and/or other portions of the network 104.

The physical network resources 114 can host and/or execute one or more virtual network resources 116. The virtual network resources 116 can include, for example, the service 112. The virtual network resources 116 also can include one or more virtual network functions, one or more virtual machines, combinations thereof, or the like. As used herein, the term "virtual machine" can be used to refer to a software implementation of a computer system, network device, storage device, combinations thereof, or the like. Virtual machines can execute programs, provide networking functions, provide data storage, and/or provide other functionality in manners that may be similar or even identical to hardware version of these machines, networking devices, data storage devices, or the like. One or more of the virtual machines can host an operating system and application programs. The operating system can be executed by the associated virtual machine to control the operation of the virtual machine and the application programs can be executed to provide the computing, storage, and/or networking functionality desired.

The service assurance platform 106 also can expose additional APIs to support communications and/or to enable control between the service assurance platform 106 and the physical network resources 114, the virtual network resources 116, the network 104, the SDN network 142, the legacy network 144, the VPN network 146, and/or other elements shown in FIG. 1. For example, the service assurance platform 106 can expose a network monitoring API 148. The network monitoring API 148 can enable detection of network abnormalities and/or alerts. For example, the service assurance platform 106 can receive or detect alerts such as the alert 118 via the network monitoring API 148, in some embodiments. It should be understood that this example is illustrative and therefore should not be construed as being limiting in any way.

The network monitoring API 148 can be accessed by the network manager 124, in some embodiments. Similarly, alerts or other abnormalities such as the alert 118 can be passed to the network manager 124 of the service assurance platform 106 via the network monitoring API 148. The network manager 124 can be configured to analyze the alert 118, analyze networks such as the network 104, the SDN network 142, the legacy network 144, the VPN network 146, and/or resources such as the physical network resources 114 and/or the virtual network resources 116 to identify root causes of the alert 118. As will be illustrated and described in more detail below with reference to FIG. 4, the service assurance platform 106 can initiate and/or perform operations to rectify abnormalities such as the alert 118. It should be understood that this example is illustrative and therefore should not be construed as being limiting in any way.

The service assurance platform 106 also can expose a network access API 150. The network access API 150 can enable the service assurance orchestrator 120 to compile one or more list of service offerings based on requests such as the service order 108. In some embodiments, the service assurance orchestrator 120 can access the service assurance service manager 126 and/or the network manager 124 to compile the list of service offerings. Additional details of compiling a list of service offerings will be illustrated and described in more detail below with reference to FIGS. 2-4.

The service assurance platform 106 can present the list of service offerings to one or more entities such as, for example, a user, a network manager or operator, a software module, combinations thereof, or the like. In some embodiments, the service assurance platform 106 can present data representing the list of service offerings using the service assurance visualizer 122. The service assurance visualizer 122 can include a visualized graphic user interface ("UI") that can enable selection of service offerings from the list, and to present a representation of the final product defined by users for confirmation and/or other purposes. It can be appreciated that the service assurance orchestrator 120 can be configured to compose the representation of the service compiled from service offering suggestions including various APIs and/or applications, to compose the representation based upon user needs and/or desires. Thus, while FIG. 1 does not illustrate a display and/or output of a user interface, it should be understood that the service assurance platform 106 can interact with a display device to facilitate selection of service offerings and/or confirmation of chosen service offerings.

The network access API 150 also can be used to enable the service assurance orchestrator 120 to provision virtual ports, circuits, and other resources in various service assurance applications. Thus, the network access API 150 can enable the service assurance platform 106 (or the service assurance orchestrator 120 thereof) to control network elements and/or the provisioning, operation, and/or monitoring thereof. It should be understood that this example is illustrative and therefore should not be construed as being limiting in any way.

The service assurance platform 106 also can expose a big data API 152. The big data API 152 can enable the service assurance platform 106 to expose data collected by and/or operated on by the service assurance platform 106. According to various embodiments, the service assurance platform 106 can expose the data to one or more data analysis systems, devices, modules, or other entities ("data analysis") 154. The data analysis system 154 can use the data to determine and/or detect performance trends, resolution trends, combinations thereof, or the like. It should be understood that this example is illustrative and therefore should not be construed as being limiting in any way.

According to various embodiments, the big data API 152 can be accessed and/or controlled by the case manager 128. The case manager 128 can be configured to analyze the network 104 (or other networks) and/or resources (e.g., the physical network resources 114 and/or the virtual network resources 116) to determine impact of failures or alerts 118 on customers, to identify root causes of the failures or alerts 118, and/or to provide diagnostic support for determining the root causes and/or impact. Thus, the case manager 128 can be configured to conduct ticketing, reporting, data analysis, and other activities relating to network outages, major events, customer impacting incidents, and/or other types of malfunctions, failures, alarms, alerts, or the like, via the big data API 152. It should be understood that this example is illustrative and therefore should not be construed as being limiting in any way.

The service assurance application API store 130 can be configured to provide one or more lists of API-enabled service assurance applications, interfaces, and/or services. Thus, the service assurance application API store 130 can be configured to provide the one or more lists to users (e.g., as part of the presentation of service offerings as mentioned above) so users or other entities can compose service assurance maintenance coverage. It should be understood that this example is illustrative and therefore should not be construed as being limiting in any way.

In practice, the service assurance platform 106 can obtain a service order 108. As noted above, the service order 108 can be obtained from one of various entities via one of various APIs 134, 136, 138, 140. Regardless of the source of the service order 108 and/or the API via which the service order 108 is received at the service assurance platform 106 (and/or the computing device 102 that executes the service assurance platform 106), the service assurance platform 106 can initiate determination of one or more service offerings that satisfy the service order 108. As mentioned above, the service assurance orchestrator 120 can provide the functionality illustrated and described herein for determining the available service offerings. The service assurance orchestrator 120 also can interact with the service assurance application API store 130, in some embodiments, as part of compiling one or more lists of service offerings. It should be understood that this example is illustrative and therefore should not be construed as being limiting in any way.

The service assurance platform 106 can present the service offerings to a user or other entity. In some embodiments, the service assurance platform 106 can interact with and/or execute a service assurance visualizer 122 to present the service offerings and/or to obtain selections of service offerings. In some embodiments, for example, the service assurance platform 106 can execute the service assurance visualizer 122 to interface with a display of the computing device 102 and/or another device such as the user device 110, which can display the service offerings. A user or other entity associated with the computing device 102 and/or the user device 110 can make a selection of a desired service offering and/or various features or functionality associated with the selected service offering.

The service assurance platform 106 can initiate orchestration of the selected service offering(s). In some embodiments, the service assurance platform 106 can engage the service assurance orchestrator 120 to orchestrate the various physical network resources 114 and/or virtual network resources 116 for a service 112 requested by way of the service order 108. Thus, the service assurance orchestrator 120 can instantiate the hardware and/or software used to provide the service 112. The service assurance platform 106 also can monitor the service 112 to provide service assurance.

In various embodiments, the service assurance platform 106 can provide alert detection and/or resolution for the service 112. According to various embodiments, the service assurance platform 106 can detect or receive an alert 118 or other indicator of a failure or malfunction associated with the service 112 and/or resources that provide the service 112. In response to the alert 118, the service assurance platform 106 can determine a root cause associated with the alert 118. According to various embodiments, the network manager 124 can be executed by the service assurance platform 106 and/or the computing device 102 to perform the root cause analysis associated with the alert 118. The service assurance platform 106 also can engage or allow analysis of the alert 118 and/or network conditions or other information by a data analysis element such as the data analysis system 154 shown in FIG. 1 to perform the root cause analysis.

The service assurance platform 106 can identify a solution (or be provided with information indicating the solution), and can resolve the issue in accordance with the identified or provided solution. After resolving the malfunction, error, failure, or the like, the service assurance platform 106 can verify connections associated with the service 112, close the alert 118 or indicate that the alert 118 has been resolved, and store data relating to the alert 118 and/or the solution to the issue indicated by the alert 118. In some embodiments, the service assurance platform 106 can expose the data to the data analysis system 154 via the big data API 152, though this is not necessarily the case. It should be understood that this example is illustrative and therefore should not be construed as being limiting in any way.

As such, it can be appreciated that embodiments of the concepts and technologies described herein can help realize a reduction in information technology costs, reduction of service 112 development lifecycles, maintenance of services 112 in real-time or near real-time, adaptive and corrective maintenance without human intervention, elimination of work center technicians to manually isolate network or other issues associated with the service 112, and/or improvement to quality of services and client satisfaction. It should be understood that these benefits are illustrative and/or are optional, and therefore should not be construed as being limiting in any way.

FIG. 1 illustrates one computing device 102, one network 104, one service assurance platform 106, one user device 110, one service 112, one instance of physical network resources 114, one instance of virtual network resources 116, one SDN network 142, one legacy network 144, one VPN network 146, and one data analysis system 154. It should be understood, however, that various implementations of the operating environment 100 can include zero, one, or more than one computing device 102; zero, one, or more than one network 104; zero, one, or more than one service assurance platform 106; zero, one, or more than one user device 110; zero, one, or more than one service 112; zero, one, or more than one instance of physical network resources 114; zero, one, or more than one instance of virtual network resources 116; zero, one, or more than one SDN network 142; zero, one, or more than one legacy network 144; zero, one, or more than one VPN network 146; and/or zero, one, or more than one data analysis system 154. As such, the illustrated embodiments should be understood as being illustrative, and should not be construed as being limiting in any way.

Figure 2:
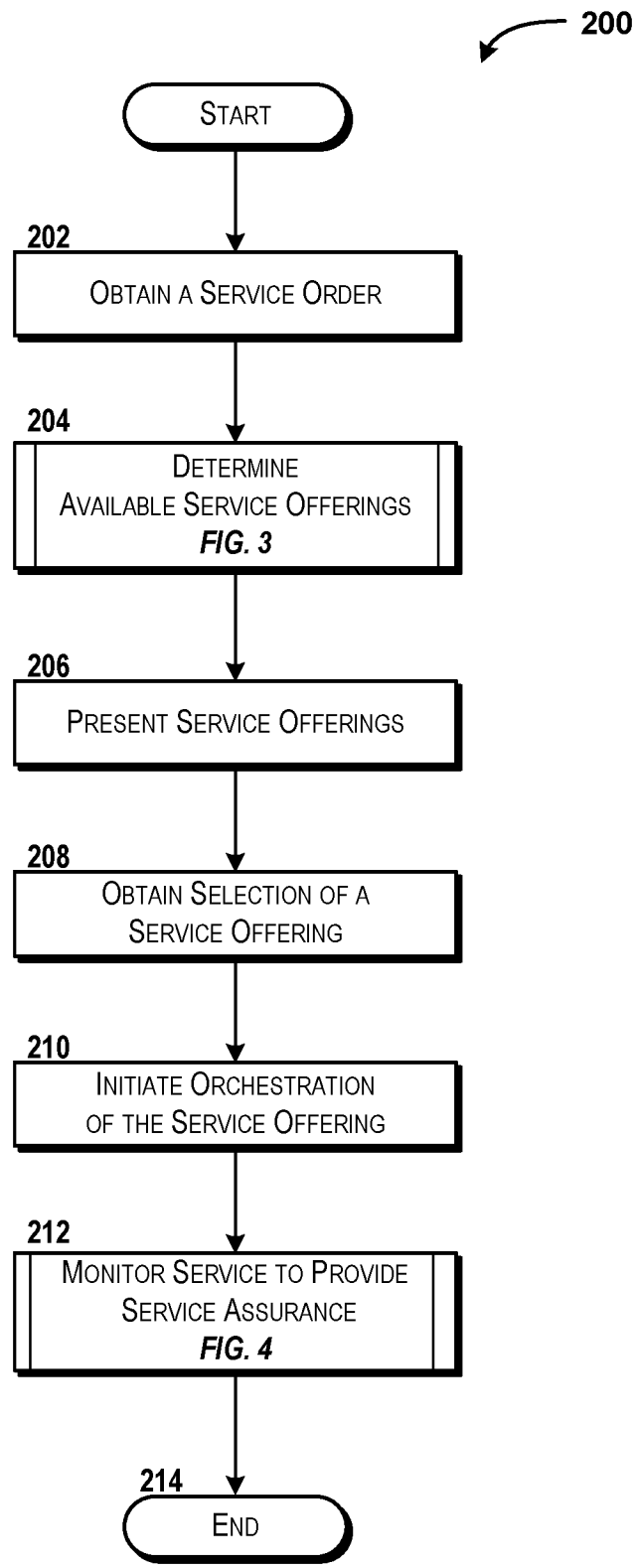
FIG. 2 is a flow diagram showing aspects of a method for providing a service using a service assurance platform, according to an illustrative embodiment of the concepts and technologies described herein.

Turning now to FIG. 2, aspects of a method 200 for providing a service using a service assurance platform will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102 to perform one or more operations and/or causing the processor to direct other components of the computing system or device to perform one or more of the operations.

For purposes of illustrating and describing the concepts of the present disclosure, the methods disclosed herein are described as being performed by the computing device 102 via execution of one or more software modules such as, for example, the service assurance platform 106. It should be understood that additional and/or alternative devices and/or network nodes can provide the functionality described herein via execution of one or more modules, applications, and/or other software including, but not limited to, the service assurance platform 106. Thus, the illustrated embodiments are illustrative, and should not be viewed as being limiting in any way.

The method 200 begins at operation 202. At operation 202, the computing device 102 can obtain a service order or request such as the service order 108. According to various embodiments, the computing device 102 can receive the service order 108, retrieve the service order 108, or otherwise obtain the service order 108. As explained above, the service order 108 can correspond to a request for a service 112, for service functions, functionality, combinations thereof, or the like. The service order 108 can be generated at a computing device such as a personal computer, a smartphone, a tablet, or other computing device such as the user device 110 illustrated and described above with reference to FIG. 1.

According to various embodiments, the service order 108 can be received by the computing device 102 via a service delivery portal 132 and/or via one or more APIs 134, 136, 138, 140. Regardless of how the service order 108 is received at or by the computing device 102, the computing device 102 can be configured to recognize the service order 108 and identify one or more features associated with the service 112 that is being requested. Thus, although not separately illustrated in FIG. 2, the computing device 102 can analyze the service order 108 and identify one or more features, functionality, and/or services requested by way of the service order 108.

From operation 202, the method 200 proceeds to operation 204. At operation 204, the computing device 102 can determine one or more available service offerings. In some embodiments, the computing device 102 can initiate the determination of the one or more available service offerings (e.g., by prompting modules or devices to make the determination). Additional details of determining available service offerings will be illustrated and described in more detail below with reference to FIG. 3. Briefly, the computing device 102 can execute the service assurance orchestrator 120 and/or other modules such as the service assurance application API store 130 to compile one or more lists of service offerings, applications, APIs, resources, and/or other components that can provide the functionality requested by way of the service order 108 obtained in operation 202.

From operation 204, the method 200 proceeds to operation 206. At operation 206, the computing device 102 can present the service offerings determined in operation 204. According to various embodiments, the service offerings determined in operation 204 can be displayed on a user interface, provided to a requestor (e.g., the user device 110 or other device), or otherwise presented to a user, software module, or other entity. According to various embodiments of the concepts and technologies described herein, the computing device 102 can execute the service assurance visualizer 122 to present the service offerings identified in operation 204. It should be understood that this example is illustrative and therefore should not be construed as being limiting in any way.

From operation 206, the method 200 proceeds to operation 208. At operation 208, the computing device 102 can obtain a selection of a service offering. According to various embodiments of the concepts and technologies described herein, the computing device 102 can obtain, in operation 208, selection of one or more of the service offerings determined in operation 204 and presented in operation 206.

Thus, it can be appreciated that operation 208 can correspond to the computing device 102 detecting and/or receiving input and/or selections associated with the presented service offerings via the service assurance visualizer 122 or other functionality. It should be understood that this example is illustrative and therefore should not be construed as being limiting in any way.

From operation 208, the method 200 proceeds to operation 210. At operation 210, the computing device 102 can initiate orchestration of the service offering. According to various embodiments of the concepts and technologies described herein, the orchestration can be initiated based upon the input detected and/or received in operation 208. In operation 210, the computing device 102 can, via execution of the service assurance orchestrator 120, initiate orchestration of the service.

In some embodiments, the service assurance orchestrator 120 can be external to the computing device 102. As such, the computing device 102 can initiate orchestration at the service assurance orchestrator 120 in some embodiments in operation 210. Regardless of where the functionality of the service assurance orchestrator 120 is located, the computing device 102 can initiate orchestration of the service 112 in operation 210.

From operation 210, the method 200 proceeds to operation 212. At operation 212, the computing device 102 can monitor the service 112 to provide service assurance. According to various embodiments, the monitoring of the service 112 can be provided by various components of the computing device 102. In some other embodiments, the monitoring of the service 112 can be performed by various entities that may be external to the computing device 102. Thus, operation 212 can include the computing device 102 initiating monitoring of the service 112. Additional details of monitoring the service 112 to provide service assurance are illustrated and described in detail below with reference to FIG. 4.

From operation 212, the method 200 proceeds to operation 214. The method 200 ends at operation 214.

Figure 3:
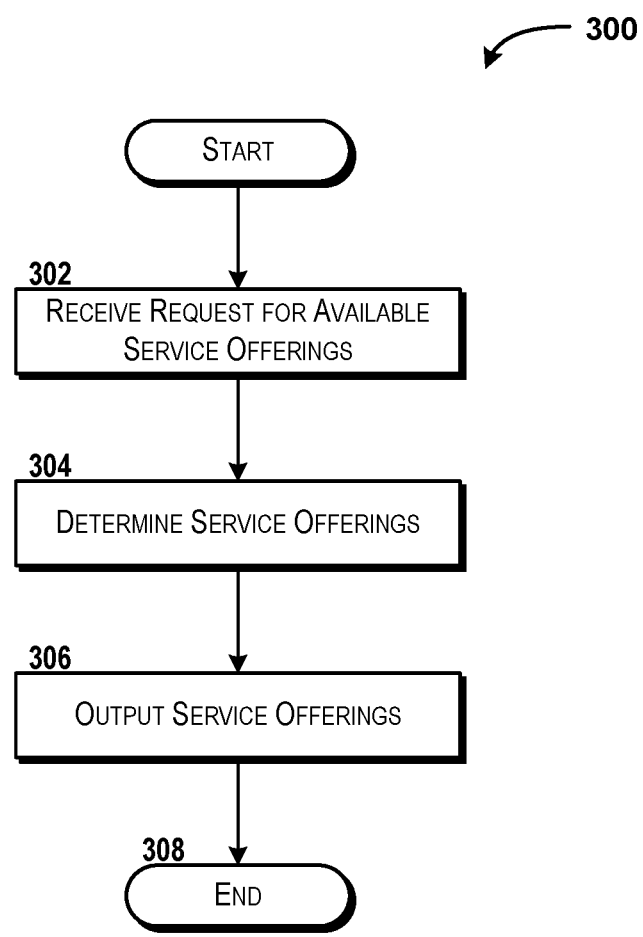
FIG. 3 is a flow diagram showing aspects of a method for determining available service offerings using a service assurance platform, according to an illustrative embodiment of the concepts and technologies described herein.

Turning now to FIG. 3, aspects of a method 300 for determining available service offerings using a service assurance platform will be described in detail, according to an illustrative embodiment. It should be understood that the functionality of the computing device 102 illustrated and described herein with reference to FIG. 3 can be, but is not necessarily, provided by the computing device 102 in accordance with execution of operation 204 illustrated and described above with reference to FIG. 2. It should be understood that this example is illustrative and therefore should not be construed as being limiting in any way.

The method 300 begins at operation 302. At operation 302, the computing device 102 can receive a request for available service offerings. It can be appreciated that the request can correspond to the computing device 102 receiving the service order 108 in operation 202 illustrated and described with reference to FIG. 2 and the computing device 102 determining, based upon the service order 108, that a list of available service offerings should be compiled.

In some embodiments, the service assurance orchestrator 120 can be external to the computing device 102 that provides some of the other functionality illustrated and described herein with reference to the service assurance platform 106. As such, the computing device 102 (or other computing device) can receive, in operation 302, a call, request, or other trigger to compile one or more lists of service offerings relevant to the service order 108 obtained in operation 202. It should be understood that this example is illustrative and therefore should not be construed as being limiting in any way.

From operation 302, the method 300 proceeds to operation 304. At operation 304, the computing device 102 can determine service offerings. According to various embodiments, the computing device 102 can execute the service assurance orchestrator 120 illustrated and described herein to compile one or more lists of service offerings, APIs, applications, and/or other service components that can be used or provided to provide the functionality requested by way of the service order 108. Thus, in operation 304, the computing device 102 can determine one or more services 112, service components, functionality, and/or other time like that are capable of providing services or functionality requested by way of the service order 108.

From operation 304, the method 300 proceeds to operation 306. At operation 306, the computing device 102 can output the service offerings determined in operation 304. According to various embodiments, the computing device 102 can execute the service assurance visualizer 122 to present the service offerings identified in operation 304. In some embodiments, operation 306 can correspond to the computing device 102 presenting the service offerings on a display or display device associated with the computing device 102 or other devices. For example, operation 306 can correspond to the computing device 102 providing information relating to the list of service offerings compiled in operation 304 to a device such as the user device 110. It should be understood that this example is illustrative and therefore should not be construed as being limiting in any way.

From operation 306, the method 300 proceeds to operation 308. The method 300 ends at operation 308.

Figure 4:
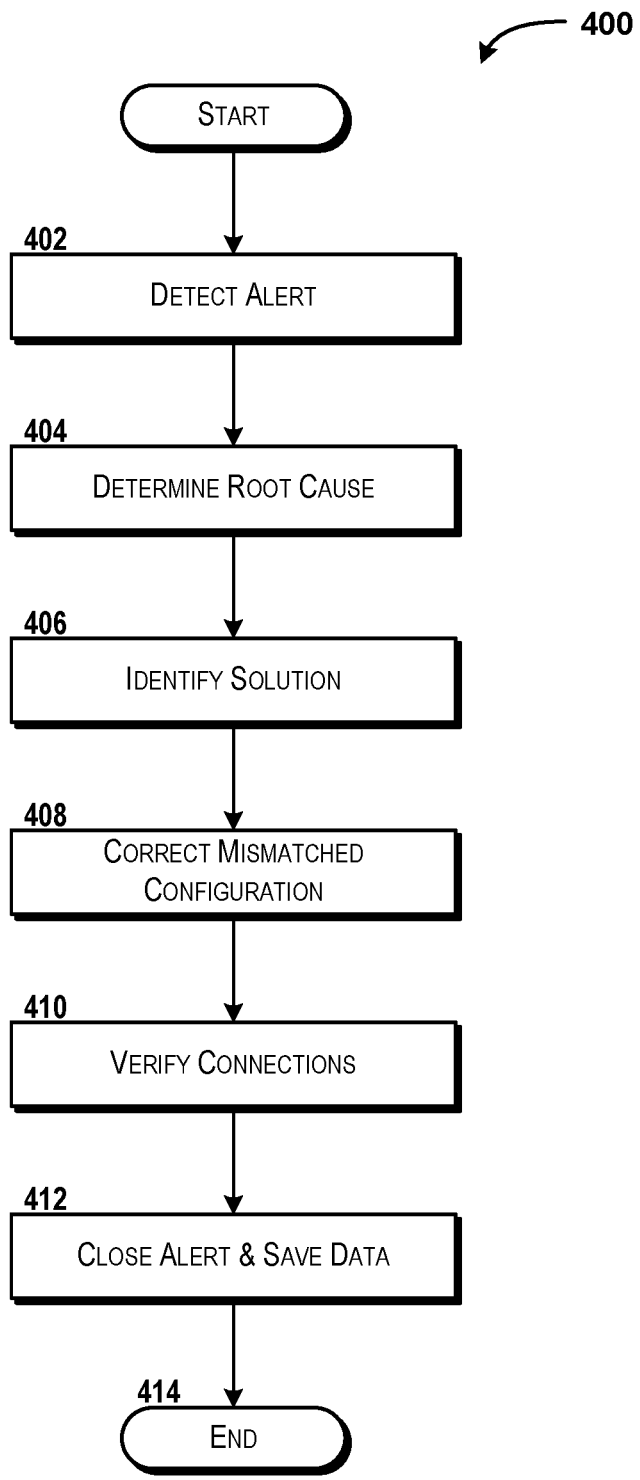
FIG. 4 is a flow diagram showing aspects of a method for monitoring a service and resolving alerts, according to an illustrative embodiment of the concepts and technologies described herein.

Turning now to FIG. 4, aspects of a method 400 for monitoring a service 112 and resolving alerts 118 will be described in detail, according to an illustrative embodiment. It should be understood that the functionality of the computing device 102 illustrated and described herein with reference to FIG. 4 can be, but is not necessarily, provided by the computing device 102 in accordance with execution of operation 212 illustrated and described above with reference to FIG. 2. It should be understood that this example is illustrative and therefore should not be construed as being limiting in any way.

The method 400 begins at operation 402. At operation 402, the computing device 102 can detect an alert 118. According to various embodiments, the computing device 102 can detect, in operation 402, one or more of a failure, a malfunction, an error, a fault condition, an alert 118, and/or other types of conditions that may indicate that a service 112 is not operating in an optimal or acceptable manner. In some embodiments, the alert 118 can correspond to the computing device 102 determining that an IPAG network or other hardware resource used to provide the service 112 has experienced a failure, error, or warning state (e.g., an IPAG network threshold alert). Because other types of alerts 118 are possible and are contemplated, it should be understood that this example is illustrative and therefore should not be construed as being limiting in any way.

From operation 402, the method 400 proceeds to operation 404. At operation 404, the computing device 102 can determine a root cause associated with the alert 118 detected in operation 402. According to various embodiments, the computing device 102 can execute the network manager 124 to correlate and locate one or more root causes for the alert 118 detected in operation 402. According to some other embodiments, the computing device 102 can engage and/or interface with a data analysis component such as the data analysis system 154 illustrated and described in FIG. 1 to perform the root cause analysis associated with operation 404. It should be understood that this example is illustrative and therefore should not be construed as being limiting in any way.

From operation 404, the method 400 proceeds to operation 406. At operation 406, the computing device 102 can identify a solution for the root cause determined in operation 404. According to various embodiments of the concepts and technologies described herein, the computing device 102 can execute the case manager 128 and/or other modules, components, or the like to provide the functionality illustrated and described herein with reference to operation 406. According to various embodiments, the computing device 102 can interface with a data analysis component such as the data analysis system 154 shown in FIG. 1 via a big data API 152 or other components.

Thus, it should be understood that operation 406 can include the computing device 102 performing root cause analysis and/or engaging other entities (e.g., the data analysis system 154) to perform the root cause analysis illustrated and described herein with reference to 406. Thus, while the embodiment of the method 400 shown in FIG. 4 illustrates identifying a solution to the root cause, it should be understood that operation 406 can include identifying the solution and/or receiving information identifying the solution from other components such as the data analysis system 154. It should be understood that this example is illustrative and therefore should not be construed as being limiting in any way.

From operation 406, the method 400 proceeds to operation 408. At operation 408, the computing device 102 can resolve the issue. In particular, the computing device 102 can resolve the issue identified by the alert 118 detected in operation 402 per the root cause and/or solution identified in operations 404 and 406. It should be understood that the computing device 102 can engage various network components and/or devices to resolve the issue identified by the alert 118 detected in operation 402. As such, the embodiment shown in FIG. 4 should be understood as being an example of one contemplated embodiment and should not be construed as being limiting in any way.

From operation 408, the method 400 proceeds to operation 410. At operation 410, the computing device 102 can verify resolution of the issue. According to various embodiments, the computing device 102 can verify the resolution of the issue by determining if the error, malfunction, or other fault condition indicated by the alert 118 obtained in operation 402 has been resolved or if the condition still persists. Although not shown in FIG. 4, the computing device 102 can be configured to return flow of the method 400 to operation 404 if the computing device 102 determines, in operation 410, that the resolution of the issue is not complete. It should be understood that this example is illustrative and therefore should not be construed as being limiting in any way.

From operation 410, the method 400 proceeds to operation 412. At operation 412, the computing device 102 can close the alert 118 detected in operation 402 and/or save data relating to the alert 118 and/or the resolution thereof. Thus, the computing device 102 can be configured to not only identify, rectify, and/or verify resolution of various fault conditions on the network 104, the computing device 102 also can be configured to close alerts 118 and/or take other steps to indicate that issues have been addressed and/or solved. According to some embodiments, the computing device 102 also can output resolution information to the data analysis system 154 for future use in resolving other issues. Thus, the solution used for a particular fault condition can be made available for future causes of a similar or same fault condition, though this is not necessarily the case.

From operation 412, the method 400 proceeds to operation 414. The method 400 ends at operation 414.

Figure 5:
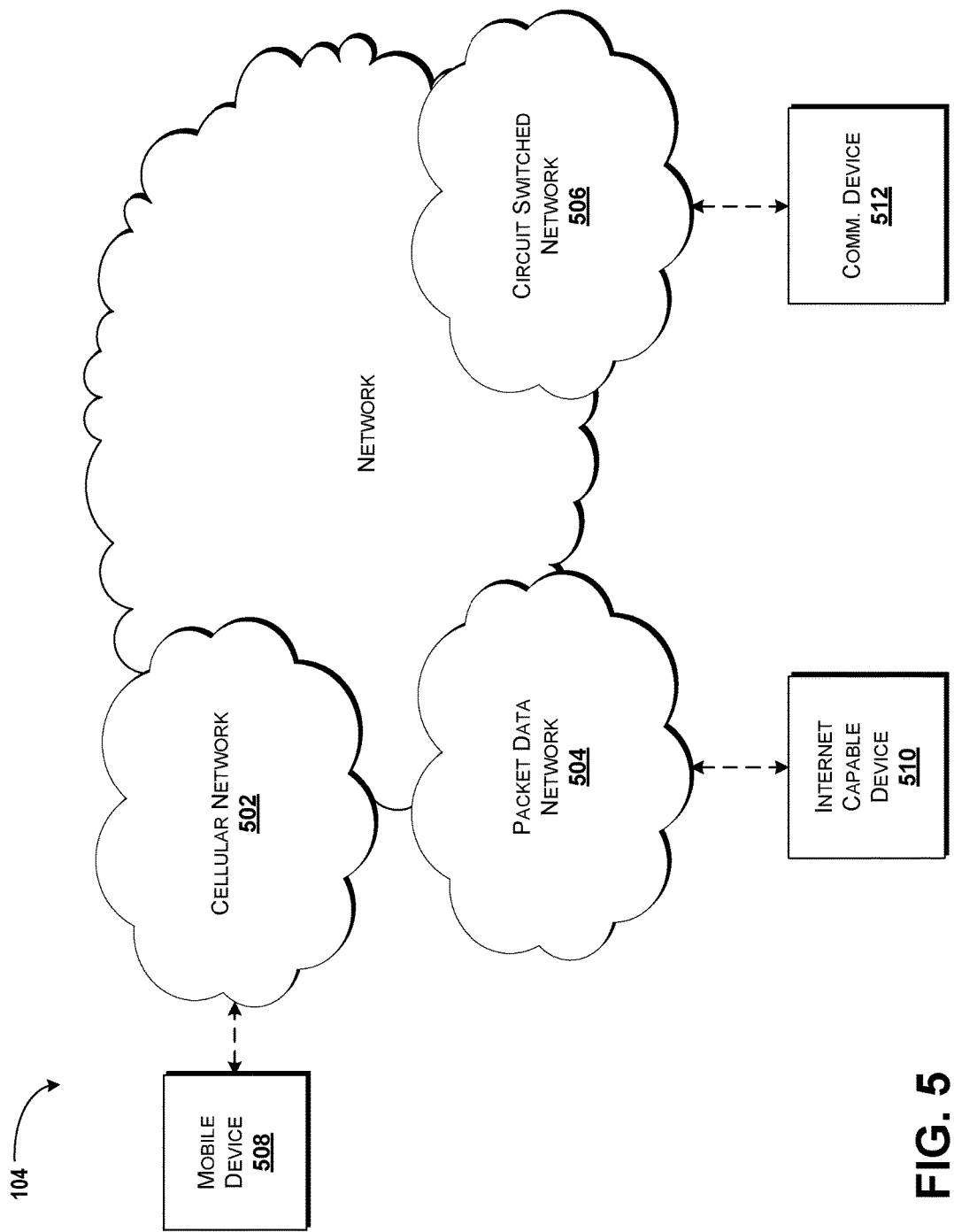
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
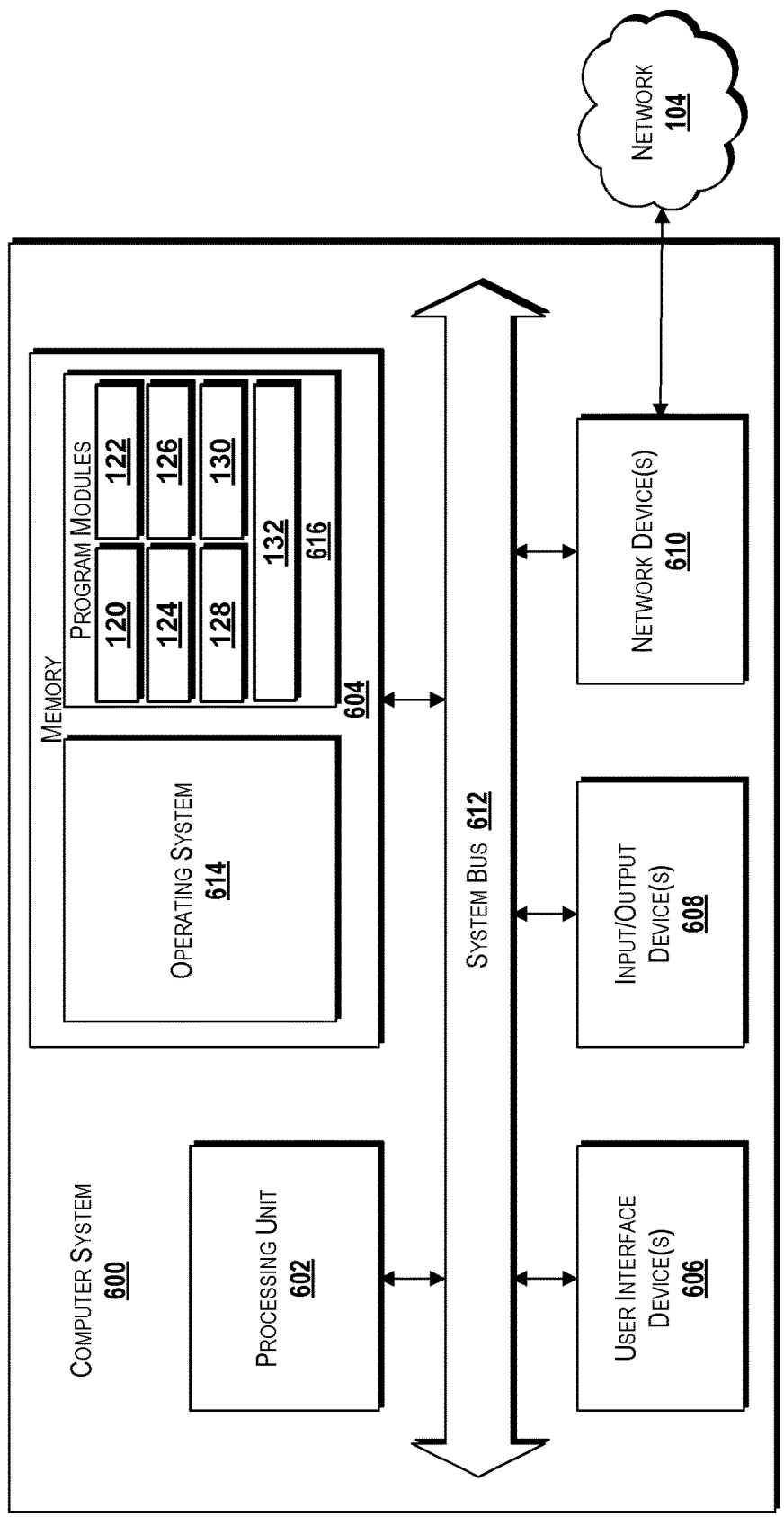
FIG. 6 is a block diagram illustrating an example computer system configured to provide the functionality of a service assurance platform, according to some illustrative embodiments of the concepts and technologies described herein.

FIG. 6 is a block diagram illustrating a computer system 600 configured to provide the functionality described herein for a service assurance platform 106, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the service assurance orchestrator 120, the service assurance visualizer 122, the network manager 124, the service assurance service manager 126, the case manager 128, the service assurance application API store 130, the service delivery portal 132, and/or other program modules, applications, services, combinations thereof, or the like. These and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the service order 108, the service 112, the alert 118, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing a service assurance platform have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
obtaining, by a computing device comprising a processor, a request for a service that provides functionality specified in the request;
initiating, by the computing device, determination of service offerings available to provide the functionality, wherein the determination of the service offerings comprises interaction with an API store to compile a list of the service offerings, wherein the service offerings comprise a service assurance application;
initiating, by the computing device, presentation of the service offerings determined to be available, wherein the presentation of the service offerings occurs at a device that is associated with the request;
obtaining, by the computing device, a selection of a service offering of the service offerings based on input associated with the device;
initiating, by the computing device, allocation of hardware to support the service, wherein the hardware comprises a physical network resource;
initiating, by the computing device, instantiation of software that is hosted by the hardware to provide the service; and
monitoring, by the computing device, the hardware and the software to provide service assurance.

2. The method of claim 1, wherein a service assurance orchestrator interacts with the API store.

3. The method of claim 1, wherein the device comprises a user device that generates the request for the service, wherein initiating the presentation of the service offerings comprises executing a service assurance visualizer, and wherein the service assurance visualizer interacts with the user device to present the service offerings at the user device.

4. The method of claim 1, further comprising:
detecting an alert relating to the service, wherein the alert indicates a malfunction associated with the physical network resource associated with the service;
determining a root cause for the malfunction of the physical network resource based partially on network conditions;
identifying a solution for the root cause determined;
resolving an issue associated with the alert;
verifying connections associated with the service;
closing the alert to indicate that the malfunction of the physical network resource has been resolved; and
storing data that relates to the alert and the solution for the root cause determined.

5. The method of claim 4, wherein detecting the alert comprises receiving the alert via a network monitoring application programming interface, wherein the alert identifies a network abnormality, wherein determining the root cause comprises determining, based on the network conditions, a cause of the network abnormality, and wherein the network monitoring application programming interface receives the alert from within a software defined network.

6. The method of claim 4, further comprising outputting the data that relates to the alert and the solution for the root cause to a data analysis system that communicates with the computing device via an application programming interface exposed by the computing device.

7. A system comprising:
a processor; and
a memory that stores computer-executable instructions that, when executed by the processor, cause the processor to perform operations comprising
obtaining a request for a service that provides functionality specified in the request,
initiating determination of service offerings available to provide the functionality, wherein the determination of the service offerings comprises interaction with an API store to compile a list of the service offerings, wherein the service offerings comprise a service assurance application,
initiating presentation of the service offerings determined to be available, wherein the presentation of the service offerings occurs at a device that is associated with the request,
obtaining a selection of a service offering of the service offerings based on input associated with the device,
initiating allocation of hardware to support the service, wherein the hardware comprises a physical network resource,
initiating instantiation of software that is hosted by the hardware to provide the service, and
monitoring the hardware and the software to provide service assurance.

8. The system of claim 7, further comprising:
a service assurance visualizer; and
a user device that generates the request for the service, wherein initiating the presentation of the service offerings comprises executing the service assurance visualizer, wherein the service assurance visualizer interacts with the user device to present the service offerings at the user device.

9. The system of claim 7, wherein a service assurance orchestrator interacts with the API store.

10. The system of claim 7, further comprising:
detecting an alert relating to the service, wherein the alert indicates a malfunction associated with the physical network resource;
determining a root cause for the malfunction of the physical network resource based partially on network conditions;
identifying a solution for the root cause determined;
resolving an issue associated with the alert;
verifying connections associated with the service;
closing the alert to indicate that the malfunction of the physical network resource has been resolved; and
storing data that relates to the alert and the solution for the root cause determined.

11. The system of claim 10, wherein detecting the alert comprises receiving the alert via a network monitoring application programming interface, wherein the alert identifies a network abnormality, wherein determining the root cause comprises determining, based on the network conditions, a cause of the network abnormality, and wherein the network monitoring application programming interface receives the alert from within a software defined network.

12. The system of claim 10, further comprising a data analysis system that communicates with the processor via an application programming interface, and wherein the computer-executable instructions, when executed by the processor, cause the processor to perform operations comprising:
outputting the data that relates to the alert and the solution for the root cause to the data analysis system.

13. A computer storage medium having computer-executable instructions stored thereon that, when executed by a processor, cause the processor to perform operations comprising:
obtaining a request for a service that provides functionality specified in the request;
initiating determination of service offerings available to provide the functionality, wherein the determination of the service offerings comprises interaction with an API store to compile a list of the service offerings, wherein the service offerings comprise a service assurance application;
initiating presentation of the service offerings determined to be available, wherein the presentation of the service offerings occurs at a device that is associated with the request;
obtaining a selection of a service offering of the service offerings based on input associated with the device;
initiating allocation of hardware to support the service, wherein the hardware comprises a physical network resource;
initiating instantiation of software that is hosted by the hardware to provide the service; and
monitoring the hardware and the software to provide service assurance.

14. The computer storage medium of claim 13, wherein the software comprises virtual network resources that are deployed to the physical network resource, and wherein the request for the service is obtained via a service delivery portal and an application programming interface.

15. The computer storage medium of claim 13, wherein initiating the presentation of the service offerings comprises executing a service assurance visualizer, wherein the service assurance visualizer interacts with a user device to present the service offerings at the user device, and wherein the user device generates the request for the service.

16. The computer storage medium of claim 13, wherein a service assurance orchestrator interacts with the API store.

17. The computer storage medium of claim 13, wherein the hardware operates on a software defined network, a legacy network, and a virtual private networking network.

18. The computer storage medium of claim 13, further comprising:
    detecting an alert relating to the service, wherein the alert indicates a malfunction associated with the physical network resource;
    determining a root cause for the malfunction of the physical network resource based partially on network conditions;
    identifying a solution for the root cause determined;
    resolving an issue associated with the alert;
    verifying connections associated with the service;
    closing the alert to indicate that the malfunction of the physical network resource has been resolved; and
    storing data that relates to the alert and the solution for the root cause determined.

19. The computer storage medium of claim 18, wherein detecting the alert comprises receiving the alert via a network monitoring application programming interface, wherein the alert identifies a network abnormality, wherein determining the root cause comprises determining, based on the network conditions, a cause of the network abnormality, and wherein the network monitoring application programming interface receives the alert from within a software defined network.

20. The computer storage medium of claim 18, further comprising a data analysis system that communicates with the processor via an application programming interface, and wherein the computer-executable instructions, when executed by the processor, cause the processor to perform operations comprising:
    outputting the data that relates to the alert and the solution for the root cause to the data analysis system.

\* \* \* \* \*